J. W. RICKER.
Corn Sheller.
No. 102,593.
Patented May 3, 1870.
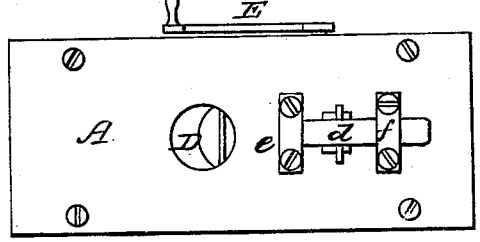
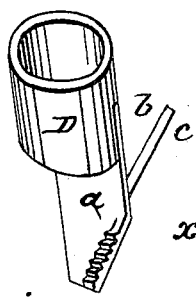
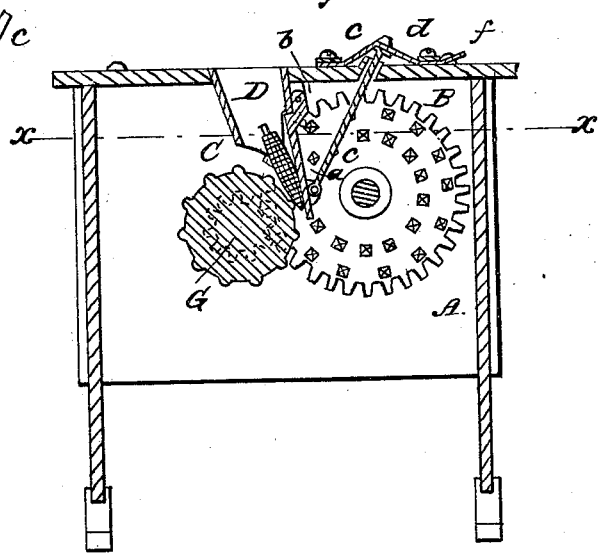
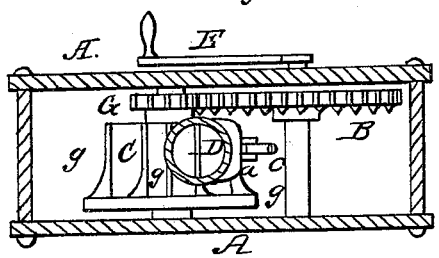
Witnesses
W. J. Cambridge
N. W. Stearns
Inventor
John W. Ricker

UNITED STATES PATENT OFFICE.

JOHN W. RICKER, OF CHELSEA, MASSACHUSETTS.

IMPROVEMENT IN CORN-SHELLERS.

Specification forming part of Letters Patent No. 102,593, dated May 3, 1870.

*To all whom it may concern:*

Be it known that I, JOHN W. RICKER, of Chelsea, in the county of Suffolk and State of Massachusetts, have invented certain Improvements in Corn-Shellers, of which the following is a full, clear, and exact description, reference being had to the accompanying drawings, making part of this specification, in which—

Figure 1 is a plan of my improved corn-sheller. Fig. 2 is a longitudinal vertical section through the center of the same. Fig. 3 is a horizontal section on the line $x\ x$ of Fig. 2. Fig. 4 is a perspective view of the conductor or spout detached.

This invention relates to an improvement in corn-shellers for which Letters Patent of the United States were granted to myself and T. S. Lewis on the 8th day of August, 1865.

In the machine referred to in the aforesaid patent, the spout or conductor for guiding the ears of corn to the shelling-wheels was attached to a weighted lever, hinged or pivoted at one end, which allowed the projection at the lower end of the conductor to yield as ears of various sizes passed through the machine, thus preventing it from becoming obstructed or clogged. This device, although it answered a good purpose, was nevertheless objectionable, for the reason that, if a large ear of corn was fed into the machine with its butt-end down, its sudden contact with the projecting portion of the spout would cause the latter, with the weighted lever, to be thrown up with a jerk beyond the required distance, when the spout would momentarily cease to press upon the ear and hold it against the shelling-wheels, and before the weighted lever could again descend so as to bring the end of the spout down upon the ear the latter would have passed down beyond it without having the kernels entirely removed therefrom.

My present invention has for its object to overcome this difficulty; and it consists in regulating the pressure of the projecting portion of the spout or conductor upon the ear of corn by means of a spring, the quick action of which effectually prevents the end of the conductor from being suddenly thrown up, as above described, and the ear is thus kept constantly in place against the shelling-wheels during its passage through the machine; and my invention also consists in providing the feed and auxiliary shelling-wheel with curved bars or teeth, instead of straight inclined bars, as heretofore, the curved bars conforming to the rounded surface of the ear, and consequently bearing upon a greater extent of its surface, which insures a more positive feed and a more certain removal of the kernels, while the ear is more effectually forced up and kept in place against the main shelling-disk than where straight bars are employed.

To enable others skilled in the art to understand and use my invention, I will proceed to describe the manner in which I have carried it out.

In the said drawings, A represents the outer casing of the machine, in which are the bearings for the shafts of the main shelling-disk B and the feed and auxiliary shelling-wheel C. D is the conductor or spout, (seen detached in Fig. 4,) which is secured to the upper portion of the casing A. Through this spout the ears of corn are fed into the machine, and are guided by it down into contact with the teeth of the wheels B C, by which the kernels are separated from the cob. The ear is pressed firmly against the teeth of the wheels B C by the lower or projecting portion, $a$, of the spout, the upper end of which is pivoted at $b$, while to its lower end is pivoted a rod, $c$, which passes up through the upper portion of the casing A, above which it is forked or bifurcated, and over this bifurcated portion passes a rubber strap or spring, $d$, which is clamped at two points by screwing down the plates $e\ f$.

The space between the projecting portion $a$ of the spout and the wheel C is such that the smallest ear of corn will be pressed by the spring $d$ firmly against the teeth of the wheels B C, while the projecting portion $a$ of the spout will readily yield to allow of the passage of the largest ears. The action of the spring is, however, so quick that the sudden contact of even the butt-end of the largest ear will not throw the projection $a$ up out of contact therewith, as is liable to occur where a weighted lever is employed, and consequently the ears, without regard to their size or which end is presented first, are kept constantly in contact with the shelling-wheels, and the complete and perfect separation of the kernels of corn from the cob is thus insured. The pressure of the projection *a* upon the ear is regulated for different kinds of corn by loosening the plate *f* and varying the tension upon the spring *d*, when the plate is again screwed down as before.

I do not limit myself to the use of a rubber spring, *d*, applied as above described, as it is evident that other descriptions of springs may be employed without departing from the spirit of my invention; and, instead of pivoting the projecting portion *a*, the entire conductor may be pivoted or hung loosely, if preferred.

The disk B is revolved by means of a crank, E, applied to its shaft, and its motion is communicated to the wheel C through the gear G, as seen in Figs. 2 and 3.

The upper surfaces of the bars or teeth *g* of the wheel C are curved, as seen in Fig. 3, so as to conform to the rounded surface of the ear of corn, and they are thus caused to bear upon a greater extent of its surface than when made straight, as heretofore. A more positive feed and greater certainty of removing or stripping off the kernels are thus insured, while the curved bars tend to keep the ear constantly in contact with the teeth of the main shelling-disk B.

*Claims.*

What I claim as my invention, and desire to secure by Letters Patent, is—

1. The combination of the hinged projecting plate *a*, rod *c*, and spring *d*, applied and operated substantially as and for the purpose herein set forth.

2. Also, in the corn-sheller constructed substantially as herein described, the combination of the wheel C with its curved teeth or bars *g*, hinged plate *a*, rod *c*, and spring *d*, as and for the purpose set forth.

JOHN W. RICKER.

Witnesses:
P. E. TESCHEMACHER,
N. W. STEARNS.